Oct. 25, 1927.　　　　　　　F. STICH　　　　　　　1,647,025
WAVE MOTOR
Filed June 7, 1927　　　　4 Sheets-Sheet 1
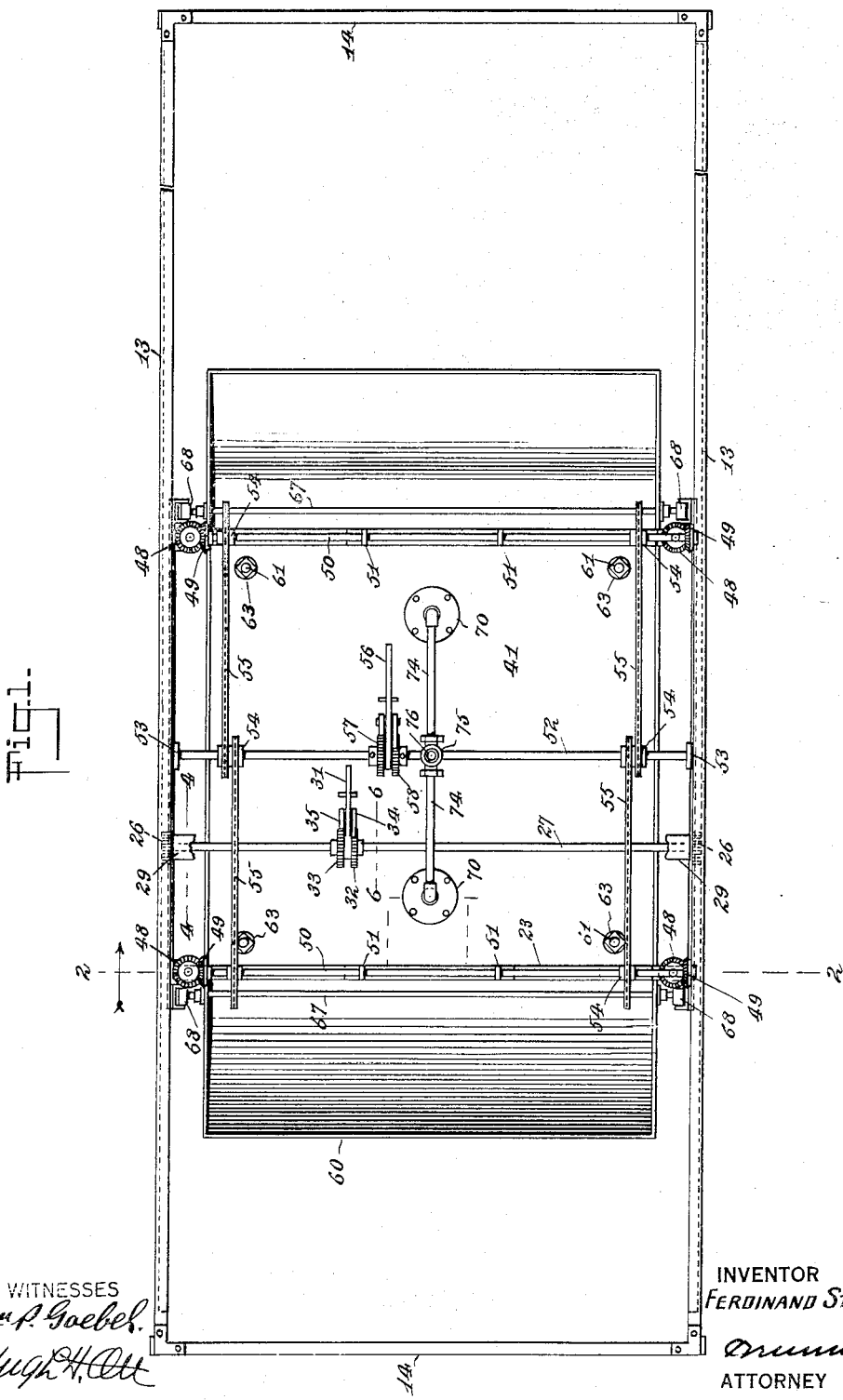
WITNESSES
INVENTOR
FERDINAND STICH
ATTORNEY Oct. 25, 1927.
F. STICH
1,647,025
WAVE MOTOR
Filed June 7, 1927    4 Sheets-Sheet 2
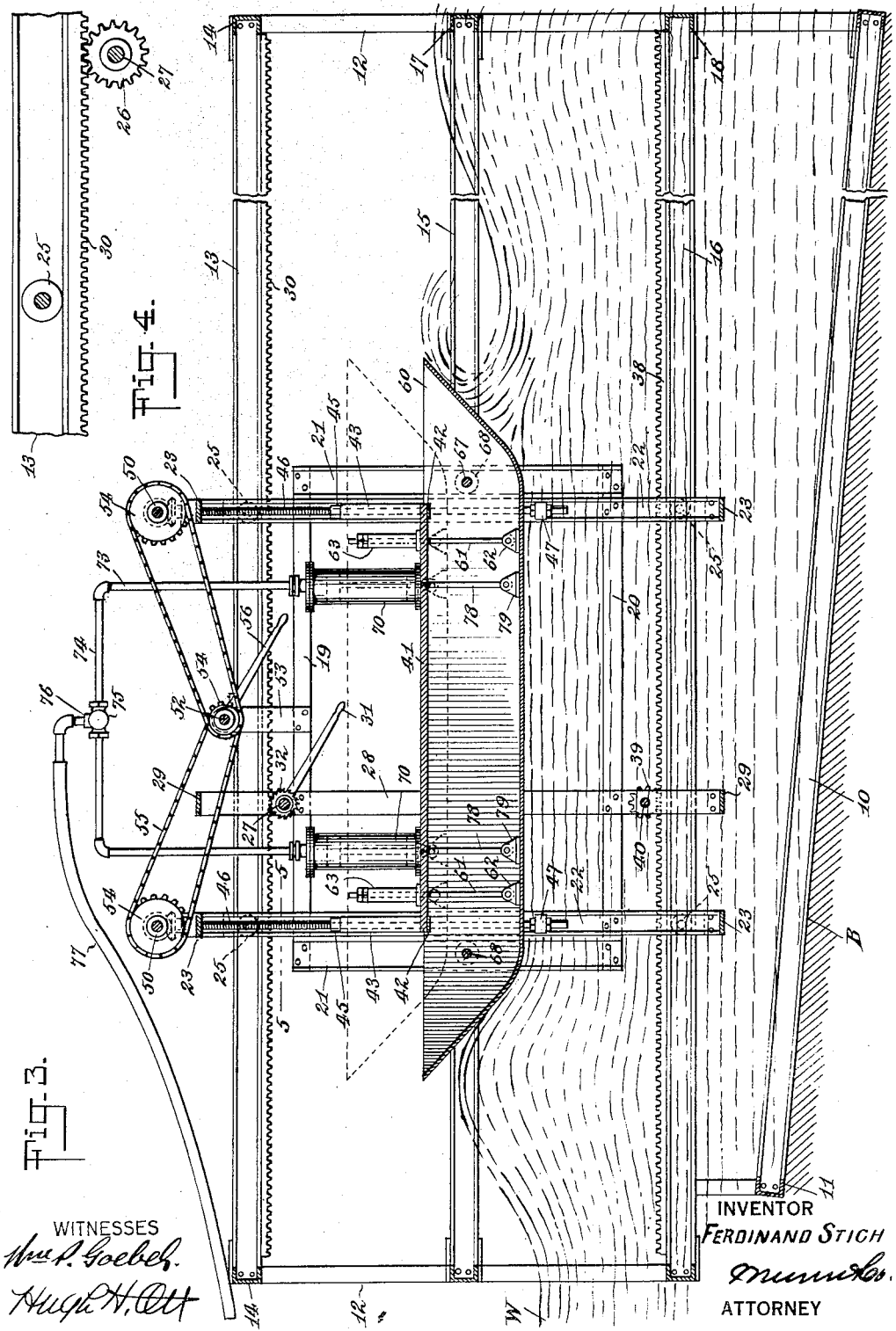
INVENTOR
FERDINAND STICH
ATTORNEY
WITNESSES Oct. 25, 1927. 1,647,025

F. STICH

WAVE MOTOR

Filed June 7, 1927  4 Sheets-Sheet 3

INVENTOR
FERDINAND STICH
BY
ATTORNEY

WITNESSES

Oct. 25, 1927. 1,647,025
F. STICH
WAVE MOTOR
Filed June 7, 1927  4 Sheets-Sheet 4
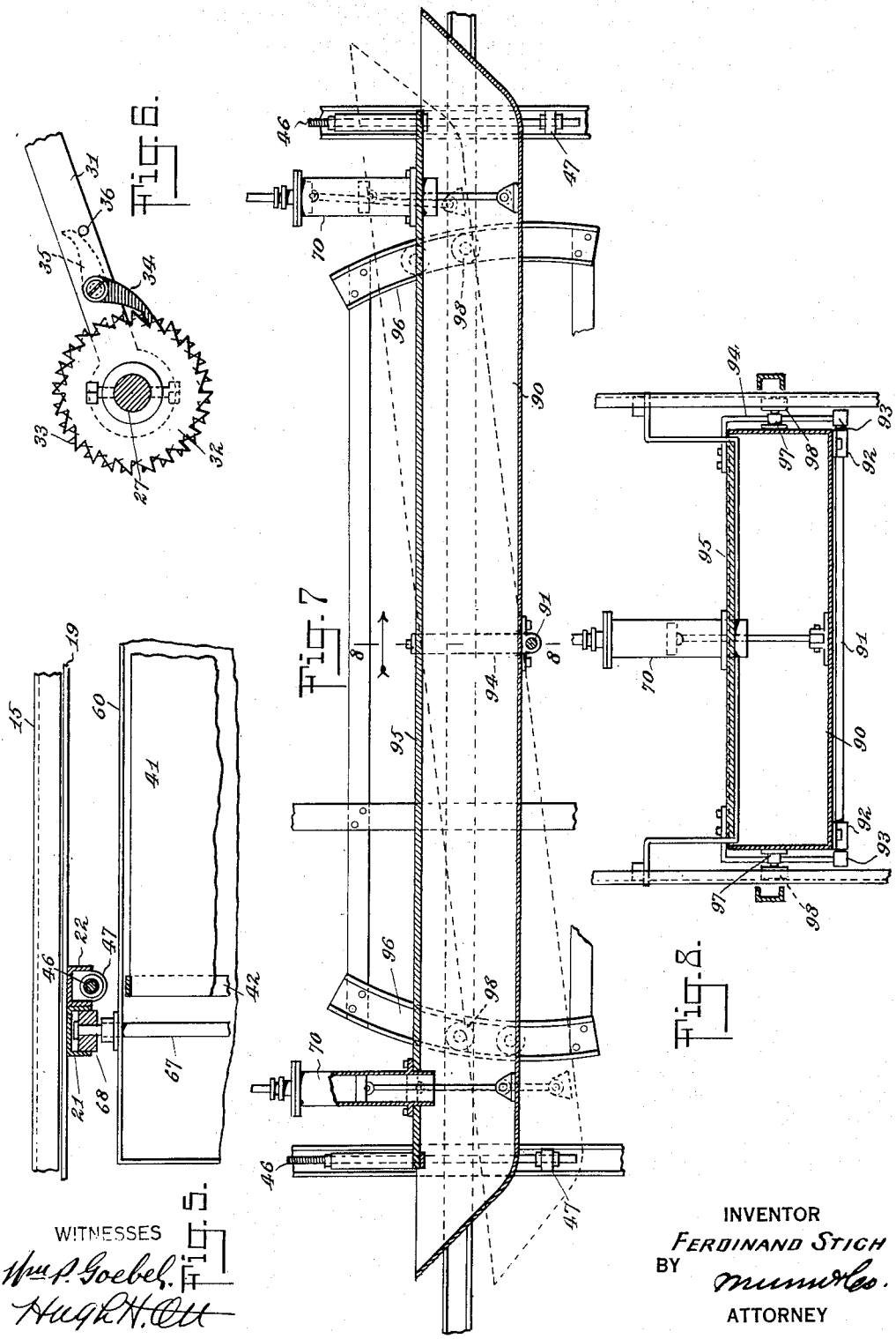
INVENTOR
FERDINAND STICH
BY
ATTORNEY Patented Oct. 25, 1927.

1,647,025

UNITED STATES PATENT OFFICE.

FERDINAND STICH, OF NEW YORK, N. Y.

WAVE MOTOR.

Application filed June 7, 1927. Serial No. 197,131.

This invention relates to water power apparatus and has particular reference to an apparatus for obtaining power from the motion of the waves of a natural body of water, such as an ocean, lake, river or the like.

More specifically the invention comprehends a wave motor including a stationary platform and a relatively movable float carried by the platform and movable with respect thereto by the force of the waves, which platform and float are provided with coacting means for obtaining and generating power from the relative movement therebetween.

Wave motors or water power apparatus of this nature, is invariably installed near the shore-line of the body of water from which the power is derived and usually in tidal waters where the level rises and falls and the water-line recedes and advances.

It is, therefore, an object of the present invention to support the platform for vertical adjustment and longitudinal movement with respect to the body of water in order to compensate for variation in the level of the same and the inflow and outflow thereof due to the rise and fall of the tide.

As a further object the invention comprehends mechanism for effecting vertical adjustment and longitudinal movement of the platform to compensate for the tidal changes of the body of water.

The invention furthermore more specifically comprehends a framework seated on the bed of the ocean, bay, lake, river, or other body of water, together with a carriage mounted for longitudinal movement in the framework, which carriage supports the platform.

Other objects reside in the comparative simplicity of construction, the economy with which the apparatus may be built and maintained, and the general efficiency derived therefrom.

With the above recited and other objects in view, reference is had to the following description and accompanying drawings in which there are exhibited certain examples or embodiments of the invention, while the appended claims define the actual scope of the invention.

In the drawings—

Figure 1 is a plan view of the wave motor;

Fig. 3 is a longitudinal sectional view taken approximately on the line 3—3 of Fig. 2;

Fig. 4 is a fragmentary longitudinal sectional view taken approximately on the line 4—4 of Fig. 1;

Fig. 5 is a fragmentary horizontal sectional view taken approximately on the line 5—5 of Fig. 3;

Fig. 6 is a fragmentary detail longitudinal sectional view taken approximately on the line 6—6 of Fig. 1;

Fig. 7 is a fragmentary longitudinal sectional view illustrating a modified adaptation of the invention;

Fig. 8 is a transverse sectional view taken approximately on the line 8—8 of Fig. 7.

Figure 2:
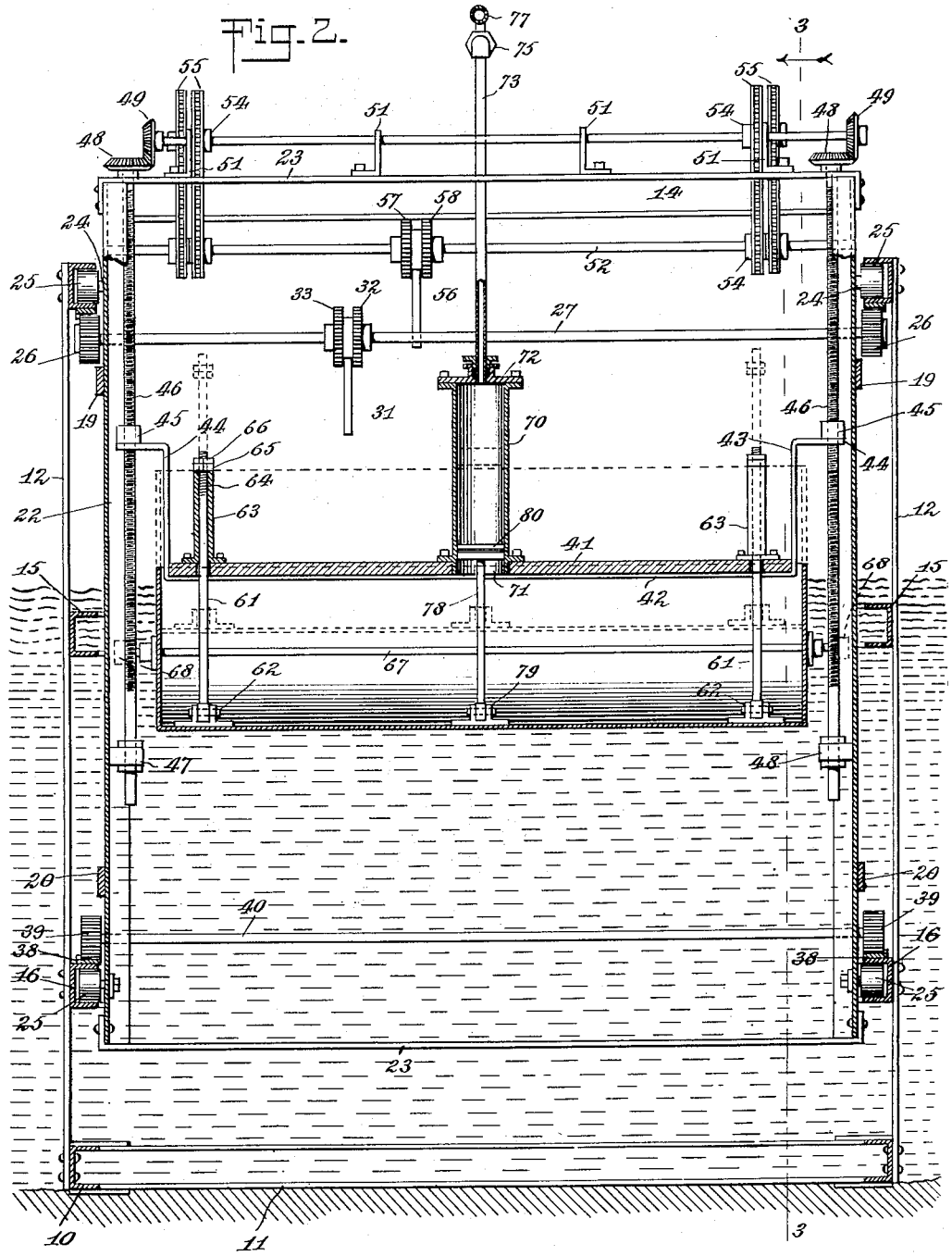
Fig. 2 is a transverse sectional view therethrough taken approximately on the line 2—2 of Fig. 1.

Referring to the drawings by characters of reference, the apparatus includes a stationary framework which comprises laterally spaced longitudinal base rails 10 preferably of channel iron construction which are connected by transverse base rails 11. The framework further includes uprights or standards 12, which are connected by upper spaced side rails 13 and transverse end rails 14 which are also preferably of angle iron construction. Upper and lower spaced intermediate side rails 15 and 16 extend from the vertical members or standards 12 and upper and lower intermediate transverse rails 17 and 18 are provided which connect the standards substantially at the juncture of the intermediate rails 15 and 16. The lower or base rails 10 are preferably inclined with respect to the upper rails 13 and intermediate rails 15 and 16, the said base rails conforming to the bed or bottom B of the body of water W in which the apparatus is arranged. A carriage consisting of upper and lower longitudinal rails 19 and 20 and vertical rails or standards 21, is mounted for longitudinal movement in the main stationary framework. The carriage is provided with vertical standards 22 adjacent the opposite ends and opposite sides thereof, which standards 22 are connected by transverse straps 23. The standards 22 have mounted on outwardly projecting shafts or trunnions 24, rollers 25, which respectively engage and roll in the lower intermediate channel-shaped longitudinal rail 16 and the upper channel-shaped longitudinal rail 13. This mounts the carriage for longitudinal movement in the stationary framework so that the same may be moved outwardly as the tide recedes or ebbs, and inwardly as the same floods or comes in.

The means for effecting longitudinal movement of the carriage in the framework consists of a pair of pinions 26 keyed to a transverse shaft 27, which is journaled, mounted or has bearing in vertical standards 28 attached to the upper and lower side rails 19 and 20 of the carriage. The upper and lower ends of the standards 28 are connected by cross members 29 to further add to the rigidity of the carriage structure. The pinions 26 engage with a rack 30 which is attached to the under side of the upper longitudinal rail 13 of the framework. The shaft 27 is adapted to be rotated in opposite directions in any suitable manner, but as illustrated the means consists of a lever 31 which is loosely fulcrumed upon the shaft 27 between a pair of spaced ratchet wheels 32 and 33, which ratchet wheels are keyed to the shaft and have the teeth disposed in opposite directions. A pair of pawls 34 and 35 are fulcrumed on the lever and arranged on opposite sides thereof, the former pawl 34 being adapted for engagement with the ratchet wheel 32 and the latter pawl 35 being adapted for engagement with the ratchet wheel 33. A transverse pin 36 is provided in the lever 31 to act as a stop or abutment for the pawl which is out of use. The pawls are adapted to be selectively engaged with the respective ratchet wheels so that rocking movement of the lever 31 operates to selectively turn the shaft 27 in opposite directions for moving the carriage and float longitudinally of the framework. In order to further guide and add to the rigidity of the structure, the upper side of the lower longitudinal rails 16 have secured thereon racks 38 and a pair of pinions 39 engaged therewith, the pinions being carried by a transverse shaft 40 and journaled in the lower portion of the standards 28.

A vertically adjustable platform 41 is carried by the carriage in the following manner: The platform 41 is provided adjacent its opposite ends with transverse U-shaped straps or slings 42, the upturned ends 43 of which are provided with outturned terminals 44 having bosses 45. The terminals and bosses are internally threaded and mounted upon jack screws 46 which jack screws are mounted for turning movement in lower bearings 47 and for bearing at their upper end in the upper transverse straps 23. The upper ends of the jack screws are provided with bevel pinions or miter gears 48, each pair of which gears or pinions 48 mesh with bevel pinions or gears 49 on a transverse shaft 50, which is journaled in transversely spaced bearings 51 carried by the upper transverse strap 23. An intermediate transverse shaft 52 is journaled in bearings 53 projecting upwardly from the upper longitudinal rails 19 of the carriage, and the shafts 50 are operatively connected with the shaft 52 by sprocket-and-chain connections 54 and 55. The intermediate transverse shaft 52 is rotated in opposite directions by a manipulating lever 56 which is of identical construction with the lever 56, is fulcrumed loosely on the shaft 52 between a pair of sprocket wheels 57 and 58, which are keyed to the shaft 52 and which have their teeth disposed in opposite directions. The same arrangement of pawls obtains, and it is obvious that the pawls may be selectively employed to turn the shaft in opposite directions by rocking movement of the manipulating lever 56. It is also understood that the operator stands upon the platform 41 for the purpose of manipulating the levers 51 and 56. When the shaft 52 is rotated in one direction, the jack screws are turned in said direction to lower the platform 41, and obviously when the shaft 52 is turned in the opposite direction the jack screws are turned coincident therewith to elevate the platform.

A float or buoyancy member 60 is supported and guided for relative vertical movement with respect to the platform, under the action of the waves. The supporting and guiding means includes a plurality of vertical guide rods 61 which are pivoted to the inner side of the bottom of the float in bearings 62, and which guide rods extend upwardly through openings in the platform and bearing sleeves 63 coincident with the openings. The upper ends of the guide rods 61 are threaded as at 64 and are provided with adjustable abutments or nuts 65 and lock nuts 66 so that the degree of vertical movement of the float with respect to the platform may be varied or adjusted. The float has extending transversely therethrough, adjacent its opposite ends, transverse shafts 67, the apertured ends of which carry guide rollers 68 which engages and roll within the channel-shaped vertical rails or standards 21.

While any desired means may be employed for converting the relative movement between the float and platform into useful power, the particular means illustrated consists of compressors for compressing air, and, as illustrated, these compressors consist of vertical cylinders 70 mounted on the platform 41 and having their open lower ends 71 extending through the platform. The upper ends are closed by heads 72, through which conduit pipes 73 extend and communicate with the interior of the cylinder. The conduit pipes 73 have branch pipes 74 connected therewith which extend toward each other and connect and communicate with the intakes of a check valve 75, the outlet 76 of which is suitably connected with a flexible conduit or hose 77 which leads to a storage tank, not shown. At the inner side of the bottom of the float, piston rods 78 are fulcrumed in bearings 79, and said piston rods are connected at the upper end to pistons 80 which are mounted for reciprocation in the cylinders 70 by virtue of the vertical movement of the float under the action of the waves.

In use and operation, the framework which is preferably disposed in a position at right angles to the shore-line, is adapted to have the carriage moved inwardly and outwardly coincident with the ebbing and flowing of the tide where the apparatus is used in a tidal water. It is also obvious that the platform and float are elevated and lowered coincident with the rise and fall of the tide. As the waves effect vertical movement of the float or buoyancy member 60, the pistons 80 reciprocating in the cylinders will compress and force past the check valve 75, compressed air which is carried off through the flexible conduit or hose 77 to a storage tank to be used for any purpose. It will thus be seen that useful power may be generated from the action of the waves, while the apparatus compensates for the rise and fall or ebb and flow of the tide where the apparatus is employed in tidal waters.

In the modified adaptation of the invention illustrated in Figs. 7 and 8, the float or buoyancy member 90 is fulcrumed for longitudinal rocking movement on a transverse shaft 91, which extends through laterally spaced bearings 92 on the under side of the bottom of the float. The opposite ends of the shaft 92 are mounted in bearings 93 on the lower ends of depending brackets 94 which are suspended from the platform 95. In order to guide the rocking motion of the float in a defined path, the carriage supports a pair of arcuate tracks 96, preferably of channel construction, while the float adjacent its opposite ends has mounted on outwardly projecting trunnions 97, guide rollers 98. The radii of the tracks are coincident with the axis of the shaft 91. In other respects the apparatus is identical with that described for the preferred form of the invention, the only difference residing in the fact that the float or buoyancy member 90 has a longitudinal rocking motion imparted thereto by the force of the waves.

What is claimed is:

1. A wave motor, including a main framework seated on the bed of the body of water in which the apparatus operates, a carriage mounted for longitudinal movement in the framework to compensate for the advancement and recession of the shore-line, a platform supported by the carriage and vertically adjustable with respect to the carriage to compensate for the rise and fall of the tide, and a float carried by the platform and movable with respect thereto by the action of the waves.

2. A wave motor, including a main framework seated on the bed of the body of water in which the apparatus operates, a carriage mounted for longitudinal movement in the framework to compensate for the advancement and recession of the shore-line, a platform supported by the carriage and vertically adjustable with respect to the carriage to compensate for the rise and fall of the tide, a float carried by the platform and movable with respect thereto by the action of the waves, and coacting means on the float and platform for generating power from the relative movement of the float with respect to the platform.

3. A wave motor, including a framework seated on the bed of a body of water and having longitudinal tracks, a carriage mounted for longitudinal movement in the framework over said tracks, a platform supported by the carriage and vertically adjustable with respect thereto, means for moving the carriage longitudinally of the framework, means for effecting vertical adjustments of the platform with respect to the carriage, and a float carried by the platform and movable relatively thereto by the action of the waves.

4. A wave motor, including a framework seated on the bed of a body of water and having longitudinal tracks, a carriage mounted for longitudinal movement in the framework over said tracks, a platform supported by the carriage and vertically adjustable with respect thereto, means for moving the carriage longitudinally of the framework, means for effecting vertical adjustments of the platform with respect to the carriage, a float carried by the platform and movable relatively thereto by the action of the waves, and coacting means on the float and platform for generating power by the relative movement therebetween caused by the action of the waves.

5. A wave motor, including a framework seated on the bed of the body of water in which it operates, a carriage mounted for longitudinal movement in the framework to compensate for recession and advancement of the shore-line, a platform supported by the carriage, and a float carried by the platform and vertically movable with respect thereto by the action of the waves.

6. A wave motor, including a framework seated on the bed of the body of water in which it operates, a carriage mounted for longitudinal movement in the framework to compensate for recession and advancement of the shore-line, a platform supported by the carriage, a float carried by the platform and vertically movable with respect thereto by the action of the waves, and means for guiding the float in its vertical movements.

7. A wave motor, including a framework seated on the bed of the body of water in which it operates, a carriage mounted for longitudinal movement in the framework to compensate for recession and advancement of the short-line, a platform supported by the carriage, a float carried by the platform and vertically movable with respect thereto by the action of the waves, and means for guiding the float in its vertical movements, said means including vertical tracks on the carriage and rollers on the float engaging said tracks.

8. A wave motor, including a framework seated on the bed of a body of water, a carriage mounted for longitudinal movement in the framework, a platform carried by the carriage, a float carried by the platform and movable with respect thereto by the action of the waves, and means for effecting vertical adjustments of the platform with respect to the carriage, comprising a plurality of vertical jack screws mounted for turning movement in the carriage, threaded supports on the platform engaged by the jack screws, and means for simultaneously and selectively turning the jack screws to effect the vertical adjustments of the platform with respect to the carriage.

FERDINAND STICH.